US 008108883B2

(12) United States Patent
Crucs

(10) Patent No.: US 8,108,883 B2
(45) Date of Patent: Jan. 31, 2012

(54) METHODS OF POPULATING A THIRD-PARTY DOCUMENT WITH DIGITAL INFORMATION CONTENT

(75) Inventor: Kevin M. Crucs, Akron, OH (US)

(73) Assignee: Apteryx, Inc., Akron, OH (US)

( * ) Notice: Subject to any disclaimer, the term of this patent is extended or adjusted under 35 U.S.C. 154(b) by 1232 days.

(21) Appl. No.: 11/778,116

(22) Filed: Jul. 16, 2007

(65) Prior Publication Data

US 2009/0025016 A1    Jan. 22, 2009

(51) Int. Cl.
*G06F 13/00* (2006.01)
(52) U.S. Cl. .................................... 719/329; 715/769
(58) Field of Classification Search .................. 719/328, 719/329; 715/769
See application file for complete search history.

(56) References Cited

U.S. PATENT DOCUMENTS

| | | | |
|---|---|---|---|
| 6,738,155 B1 * | 5/2004 | Rosenlund et al. | 358/1.15 |
| 6,822,663 B2 * | 11/2004 | Wang et al. | 715/854 |
| 7,636,883 B2 * | 12/2009 | Albornoz et al. | 715/231 |
| 2002/0111962 A1 | 8/2002 | Crucs | |
| 2004/0145603 A1 * | 7/2004 | Soares | 345/730 |
| 2006/0206457 A1 | 9/2006 | Crucs | |
| 2006/0277482 A1 * | 12/2006 | Hoffman et al. | 715/764 |
| 2007/0250783 A1 * | 10/2007 | Wu et al. | 715/762 |

* cited by examiner

*Primary Examiner* — Andy Ho
(74) *Attorney, Agent, or Firm* — Hahn Loeser & Parks LLP

(57) ABSTRACT

Methods of populating a document with digital information content. An information management software application is launched on a computer-based platform and a data drop window or a base format document is opened such that digital files, having digital data content, may be easily dragged and dropped (or pasted) into data holder locations of the data drop window or the base format document. A third-party document generation application is launched on the computer-based platform such that the third-party document generation application is able to communicate with the information management software application, for example, through an API, or the third-party document generation application is able to open and save the base format document, such that a third-party document, that is populated with the digital data content, may be automatically generated.

81 Claims, 8 Drawing Sheets

METHODS OF POPULATING A THIRD-PARTY DOCUMENT WITH DIGITAL INFORMATION CONTENT

TECHNICAL FIELD

Certain embodiments of the present invention relate to the generation of documentation. More particularly, certain embodiments of the present invention relate to a system and methods of populating digital information (e.g., images, text, graphics) into a third-party document.

BACKGROUND OF THE INVENTION

It is often desirable to import digital data content, such as text or images, into a third-party document from some other application. For example, a physician or dentist may desire to create a third-party document using medical images that are accessible from a patient management software application. The third-party document may be a medical report created by the physician, for example.

Today, digital image content may be automatically imported into a Microsoft Word document using a somewhat complex configuration of macros and document templates. For example, an image management software application can copy a document template to a target directory and save image files and patient information files to that target directory. The document template includes a set of macros. A user can then invoke Microsoft Word (a third-party application), and use Microsoft Word to open the document template and run the macros in the document template, within the target directory, to populate various areas in a document of Microsoft Word with the image and patient content from the image files and patient information files. Such an implementation is cumbersome and unique to working with Microsoft Word.

It is desirable to have a more flexible and less complex way to populate any type of third-party document with many different types of digital data content.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

An embodiment of the present invention provides a method of populating a document with digital information content. The method comprises launching an information management software application on a computer-based platform and opening a data drop window within the information management software application to display a representation of a document layout within the data drop window. The method further comprises selecting a first digital file having a first digital data content using the information management software application. The method also comprises dragging and dropping the selected first digital file into a displayed first data holder location of the displayed document layout representation within the data drop window, using the information management software application, such that the first data holder location of the displayed document layout representation is populated with the first digital data content. The method further comprises launching a third-party document generation application on the computer-based platform. The method also comprises the information management software application communicating with the third-party document generation application via at least one application program interface (API) on the computer-based platform such that the at least one API directs the third-party document generation application to generate a third-party document based on the populated document layout representation within the data drop window.

Another embodiment of the present invention provides a software interface embodied on a computer-readable medium for execution on a computer-based platform in conjunction with an information management software program for populating a document layout representation with image, text, graphic, and/or clipboard information, and in conjunction with a third-party document generation application for generating third party documents. The software interface comprises at least one application program interface (API) that facilitates communication between the information management software application and the third-party document generation application such that the at least one application program interface directs the third-party document generation application to generate a third party document based on a populated document layout representation displayed within a window of the information management software application.

A further embodiment of the present invention provides a method of populating a document with digital information content. The method comprises launching an information management software application on a computer-based platform and opening a data drop window within the information management software application. The method further comprises selecting a first digital file having a first digital data content using the information management software application and dragging and dropping the selected first digital file into the data drop window using the information management software program. The method also comprises launching a third-party document generation application on the computer-based platform. The method further comprises selecting a predefined document layout and opening a third-party document having the selected document layout using the third-party document generation application. The method also comprises the third-party document generation application communicating with the information management software application to populate the third-party document with digital data content from the data drop window.

Another embodiment of the present invention provides a method of populating a document with digital information content. The method comprises launching an information management software application on a computer-based platform. The method further comprises opening a first base format document, having a base format, within the information management software application, wherein the first base format document has a first document layout, and wherein the base format is recognizable by a third-party document generation application. The method also comprises selecting a first digital file having a first digital data content using the information management software application. The method further comprises dragging and dropping the selected first digital file into a displayed first data holder location defined by the first document layout of the first base format document, using the information management software application, such that the first data holder location of the first base format document is populated with the first digital data content. The method also comprises saving the first base format document on the computer-based platform using the information management software application. The method further comprises launching the third-party document generation application on the computer-based platform and opening the first base format document using the third-party document generation application on the computer-based platform. The method also comprises saving the first base format document as a third-party document on the computer-based platform.

A further embodiment of the present invention provides a computer-readable medium having computer-executable instructions for performing a method on a computer-based platform. The method includes opening and displaying a data drop window and selecting and displaying a representation of a predefined document layout within the data drop window. The method further includes selecting a first digital file having a first digital data content and dragging and dropping the selected first digital file into a displayed first data holder of the displayed document layout representation within the data drop window such that the first data holder location of the displayed document layout representation is populated with the first digital data content. The method also includes communicating with a third-party document generation application via at least one application program interface (API) such that the at least one API directs the third-party document generation application to generate a third-party document based on the populated document layout representation within the data drop window.

These and other advantages and novel features of the present invention, as well as details of an illustrated embodiment thereof, will be more fully understood from the following description and drawings.

DETAILED DESCRIPTION OF THE INVENTION

Figure 1:
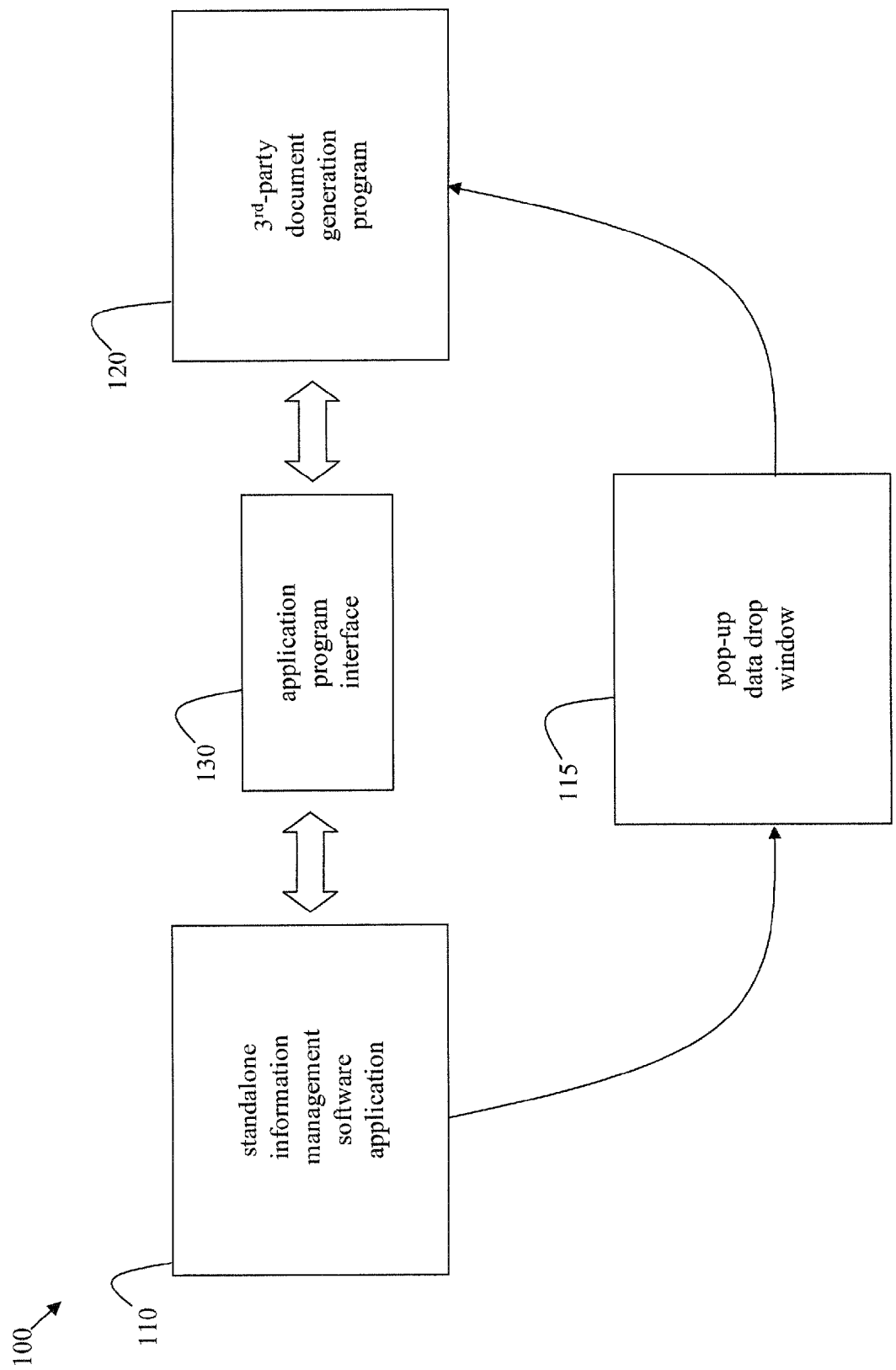
FIG. 1 is a representative illustration of the relationships between software components used on a computer-based platform to populate a third-party document with digital information content, in accordance with an embodiment of the present invention.

FIG. 1 is a representative illustration 100 of the relationships between software components used on a computer-based platform to populate a third-party document with digital information content, in accordance with an embodiment of the present invention. The various software components include a standalone information management software application 110, a third-party document generation program 120, and at least one application program interface (API) 130 providing communication between the standalone information management software application 110 and the third-party document generation program 120. A pop-up data drop window 115 may be opened within the information management software application 110 to facilitate the population of a third-party document, as is described herein.

The information management software application 110 may be any type of software application that is capable of manipulating and managing information in some way. For example, in accordance with an embodiment of the present invention, the information management software application 110 comprises a patient management software application that is used in a medical office (e.g., a doctor's office or a dentist's office) or a hospital, for example, to manage patient records, medical images, medical insurance information, etc. In accordance with another embodiment of the present invention, the information management software application 110 comprises an insurance management software application that is used in an insurance office, for example, to manage the policies and claims of insured automobile drivers. Other information management software application embodiments for other applications are possible as well, in accordance with other embodiments of the present invention.

The third-party document generation application 120 may be any type of software application that is capable of creating a digital document and manipulating digital information within that document. For example, in accordance with an embodiment of the present invention, the third-party document generation application 120 comprises a word processing software application (e.g., MS Word). In accordance with another embodiment of the present invention, the third-party document generation application 120 comprises a slide presentation software application (e.g., MS PowerPoint). Other third-party document generation application embodiments for other applications are possible as well, in accordance with other embodiments of the present invention.

In accordance with various embodiments of the present invention, both the third-party document generation application 120 and the information management software application 110 are capable of running on a computer-based platform such as, for example, a personal computer (PC) or a work station.

Figure 2:
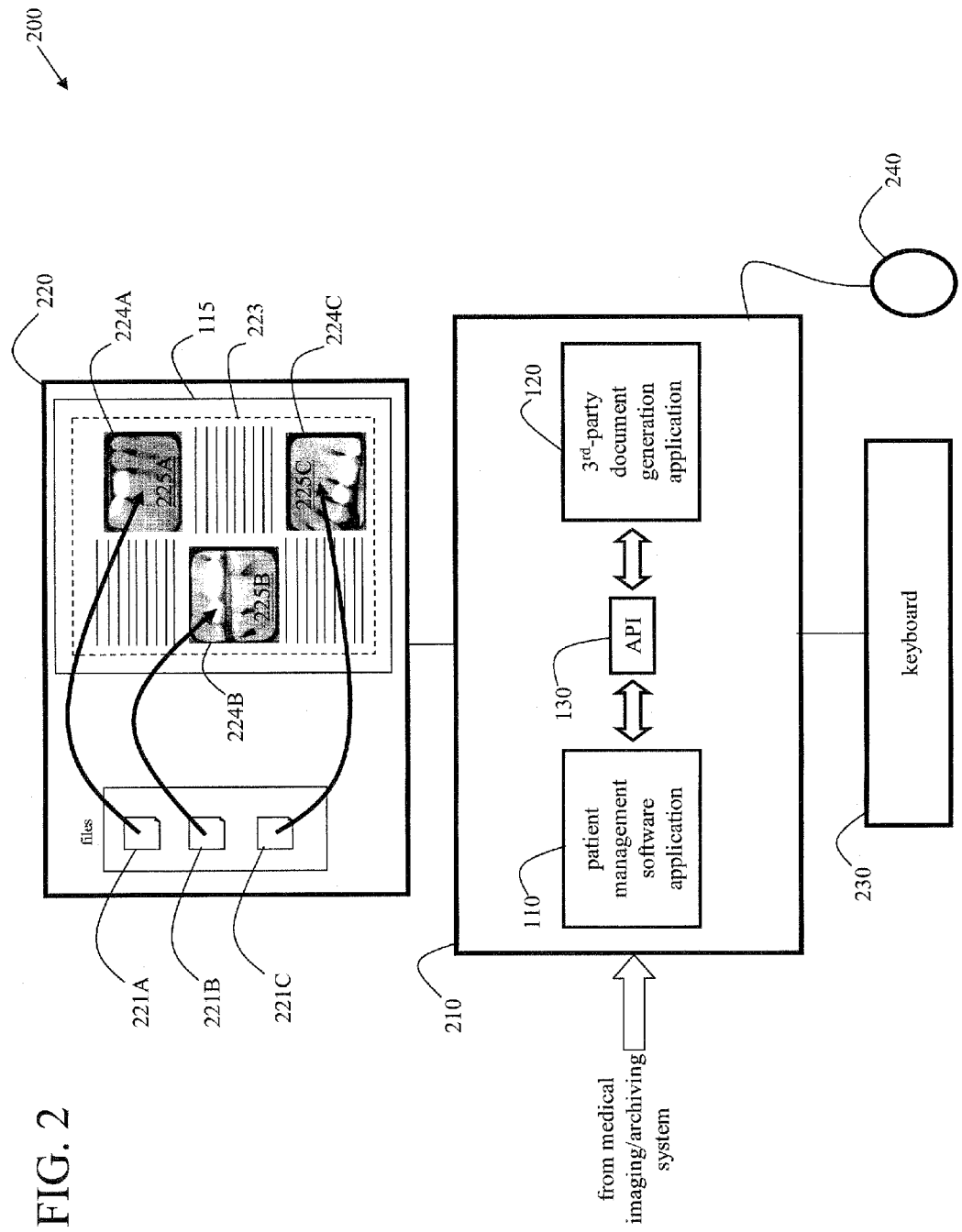
FIG. 2 is a schematic illustration of an exemplary embodiment of a computer-based platform used to populate a third-party document with digital information content using the software component relationships of FIG. 1, in accordance with various aspects of the present invention.

FIG. 2 is a schematic illustration of an exemplary embodiment of a computer-based platform 200 used to populate a third-party document with digital information content using the software component relationships 100 of FIG. 1, in accordance with various aspects of the present invention. In accordance with an embodiment of the present invention, the computer-based platform 200 includes a processor-based component 210 including processing-capability and memory for running the software applications. The computer-based platform 200 also includes a display 220, a keyboard 230 and a mouse 240, all operationally connected to the processor-based component 210. The computer-based platform 200 may be any standard and/or commercially available platform capable of running the patient management software application 110, the third-party document generation application 120, and at least one API 130.

In accordance with an embodiment of the present invention, the computer-based platform 200 is capable of interfacing with a medical imaging/archiving system (not shown) via a network (not shown) using the patient management software application 110. In such an embodiment, the patient management software application 110 is capable of downloading medical images, patient records, and other information from the medical imaging/archiving system.

Figure 3:
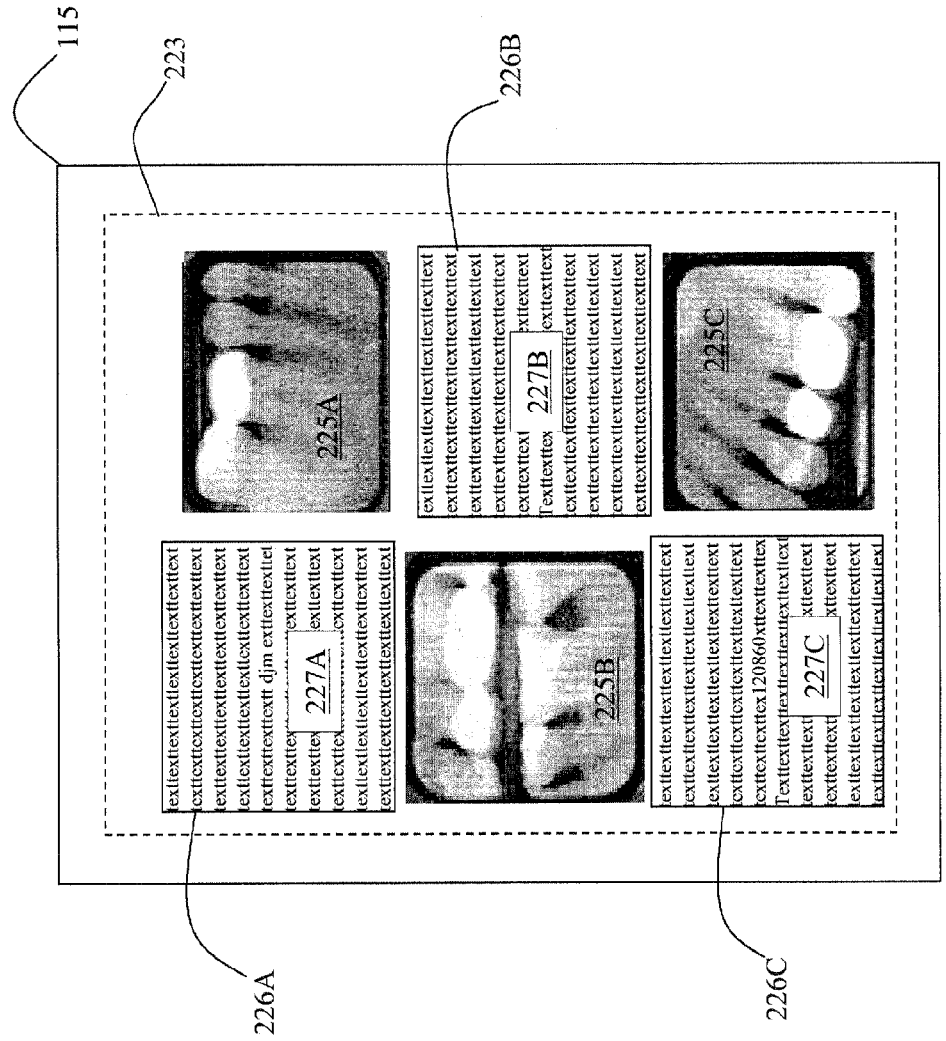
FIG. 3 is an illustration of a first exemplary embodiment of a data drop window displaying a representation of a document layout that is populated with image and text digital data content, in accordance with various embodiments of the present invention.
Figure 4:
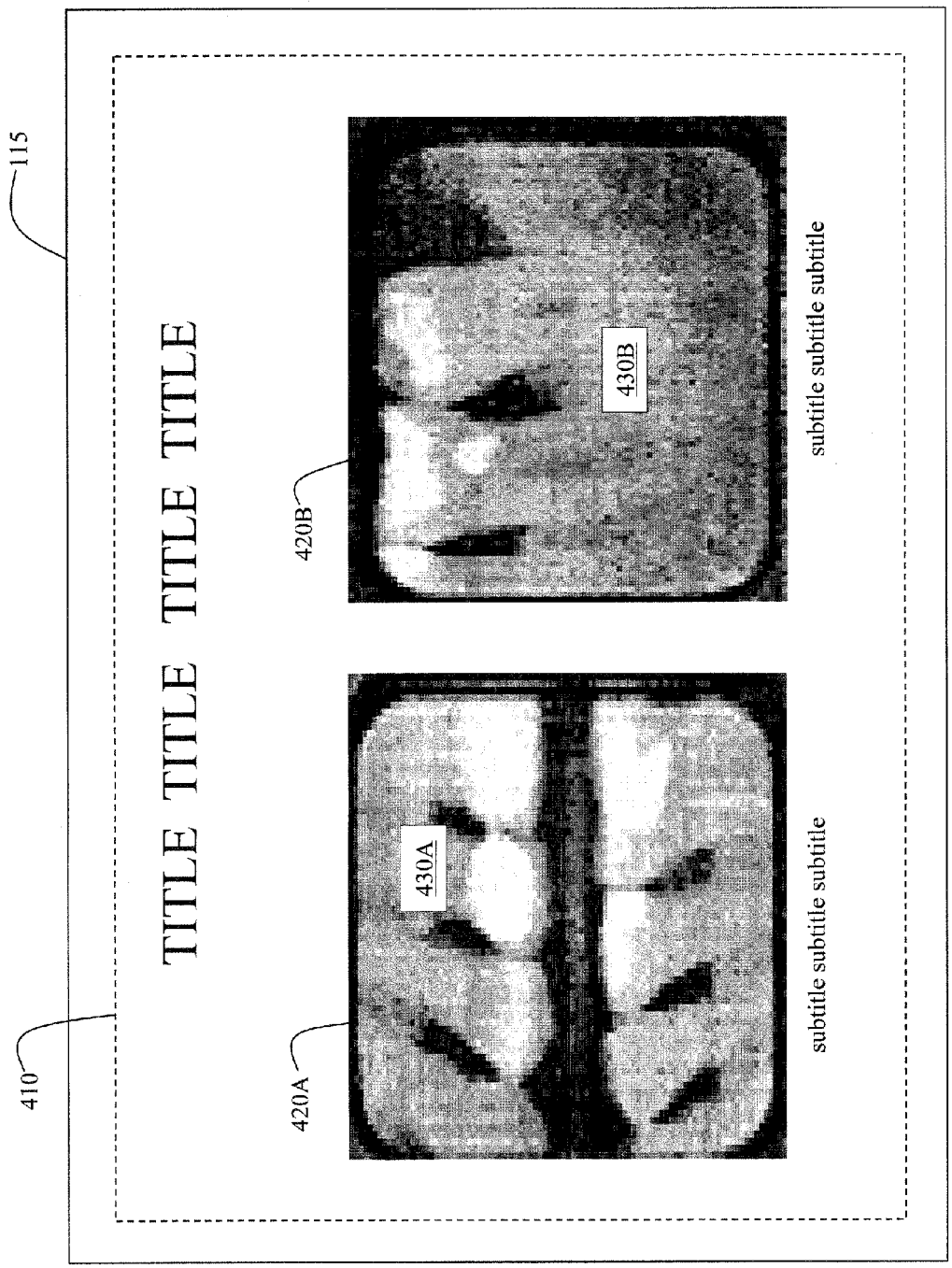
FIG. 4 is an illustration of a second exemplary embodiment of a data drop window displaying a representation of a document layout that is populated with image digital data content, in accordance with various embodiments of the present invention.

As shown on the display 220 of the computer-based platform 200, digital files 221A-221C may be dragged and dropped into a data drop window 115 in order to populate a representation 223 of a document layout displayed in the data drop window 115, as is described herein in more detail below. The digital files 221A-221C are represented by graphical icons on the display 220. FIG. 3 is an illustration of a first exemplary embodiment of the data drop window 115 displaying a document layout representation 223 of a word processing document layout that is populated with image and text digital data content, in accordance with various embodiments of the present invention. FIG. 4 is an illustration of a second exemplary embodiment of a data drop window 115 displaying a representation 410 of a slide presentation document layout that is populated with image digital data content, in accordance with various embodiments of the present invention.

The representations 223 and 410 include data holder locations into which the digital files may be dragged and dropped into, and within which the corresponding digital data content may be displayed. For example, referring again to FIG. 2, the digital file 221A may be selected (e.g., using the mouse 240) and dragged and dropped into a first data holder location 224A, using the patient management software application 110 on the computer-based platform 200. When the digital file 221A is dragged and dropped into the data holder location 224A, the corresponding digital data content (an image) 225A of the digital file 221A is displayed within the data holder location 224A. Similarly, the digital files 221B and 221C may be selected and dragged and dropped into the respective data holder locations 224B and 224C, wherein the corresponding digital data content (images) 225B and 225C are displayed. The data holder locations 224A-224C do not have to be tied in any way to the digital files 221A-221C before dragging and dropping. For example, the digital file 221A could be dropped into the data holder location 224B or 224C. As long as there is a defined data holder location within the document representation 223, a digital file may be dropped into that data holder location, as long as the data holder location is not already populated with digital data content.

Referring again to FIG. 3, text data content may also be populated into the document layout representation 223 in the data drop window 115 in a similar manner to image data content. That is, a digital file in the information management software application 110 may be selected and dragged and dropped into a data holder location such that the text data content is displayed in the data drop holder location. For example, the data holder location 226A may be populated with the text data content 227A. Similarly, the data holder locations 226B and 226C may be respectively populated with the text data content 227B and 227C. Referring again to FIG. 4, image data content 430A and 430B have been populated into data holder locations 420A and 420B, respectively, within the document representation 410 of the data drop window 115. In accordance with an embodiment of the present invention, the digital data content (e.g., text, images) are automatically sized to fit the corresponding data holder locations.

Figure 5:
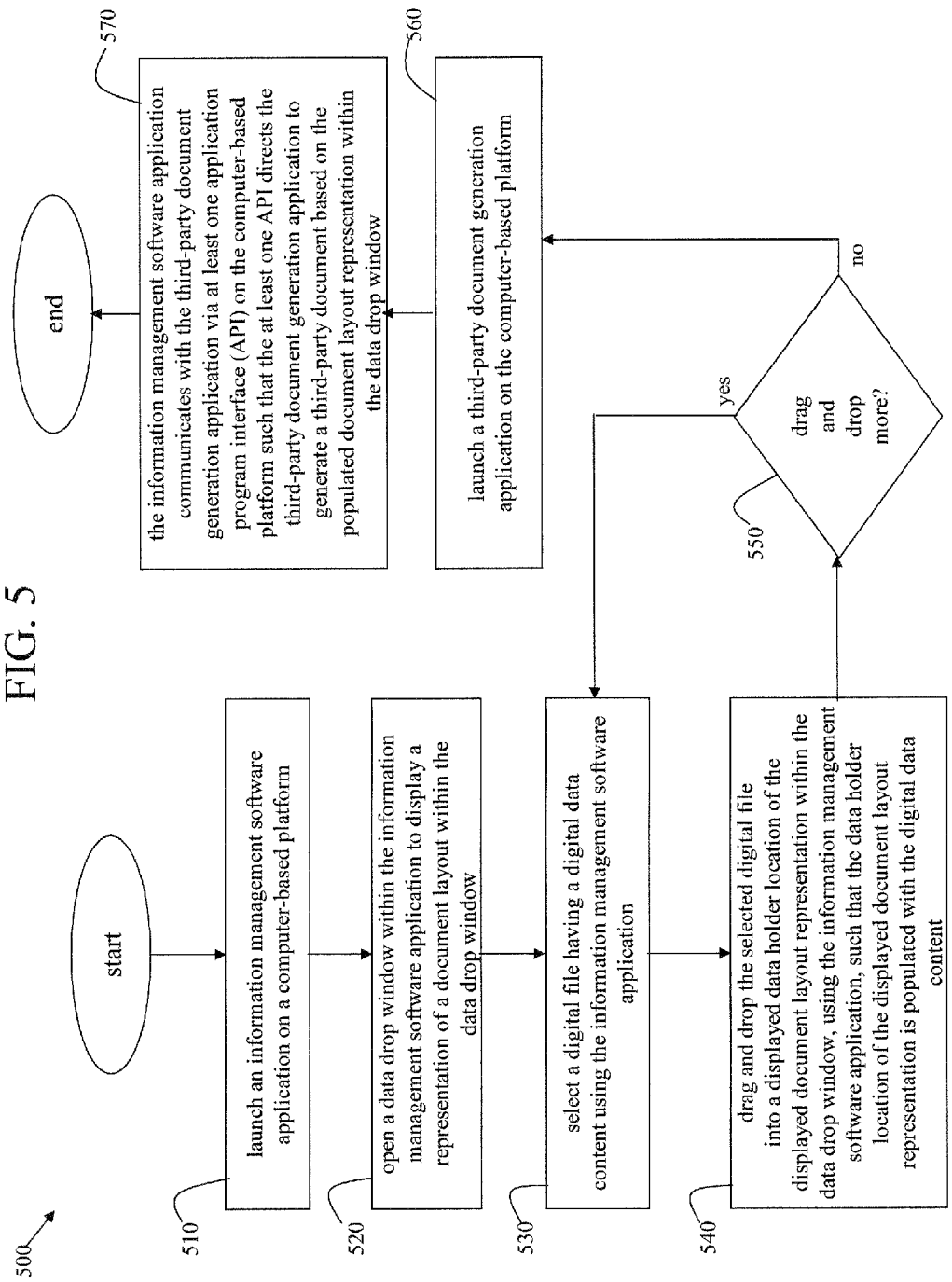
FIG. 5 is a flowchart of a first exemplary embodiment of a method of populating a document with digital information content, in accordance with various aspects of the present invention.

FIG. 5 is a flowchart of a first exemplary embodiment of a method 500 of populating a document with digital information content, in accordance with various aspects of the present invention. In step 510, an information management software application is launched on a computer-based platform. In step 520, a data drop window is opened within the information management software application to display a representation of a document layout within the data drop window. In step 530, a digital file having a digital data content is selected using the information management software application. In step 540, the selected digital file is dragged and dropped into a displayed data holder location of the displayed document layout representation within the data drop window, using the information management software application, such that the data holder location of the displayed document layout representation is populated with the digital data content.

In step 550, a decision is made as to whether or not to select and drag and drop any further digital files into other data holder locations of the document layout representation (e.g., second and third digital files containing second and third digital data content to be dropped into second and third data holder locations). If so, then the additional digital files are dragged and dropped. If not, then in step 560, a third-party document generation application is launched on the computer-based platform. In step 570, the information management software application communicates with the third-party document generation application via at least one application program interface (API) on the computer-based platform such that the at least one API directs the third-party document generation application to generate a third-party document based on the populated document layout representation within the data drop window. The third-party document generation application does not have to be launched exactly after step 560. However, the third-party document generation application is launched sometime before step 570 is executed. That is, the third-party document generation application has to be launched before the API can communicate between the two applications.

Therefore, the method 500 of FIG. 5 clearly shows that the populated document layout representation (e.g., the populated document layout representation 223 in FIG. 2 and FIG. 3) is used to generate and populate a third-party document. The third-party document may be a word processing document, a slide presentation document, or some other type of document that may be generated by the corresponding third-party document generation application 120, in accordance with various embodiments of the present invention. The digital data content may comprise text, images, graphics, and/or clipboard objects, in accordance with an embodiment of the present invention. Also, the information management software application may be, for example, a patient management software application.

Figure 6:
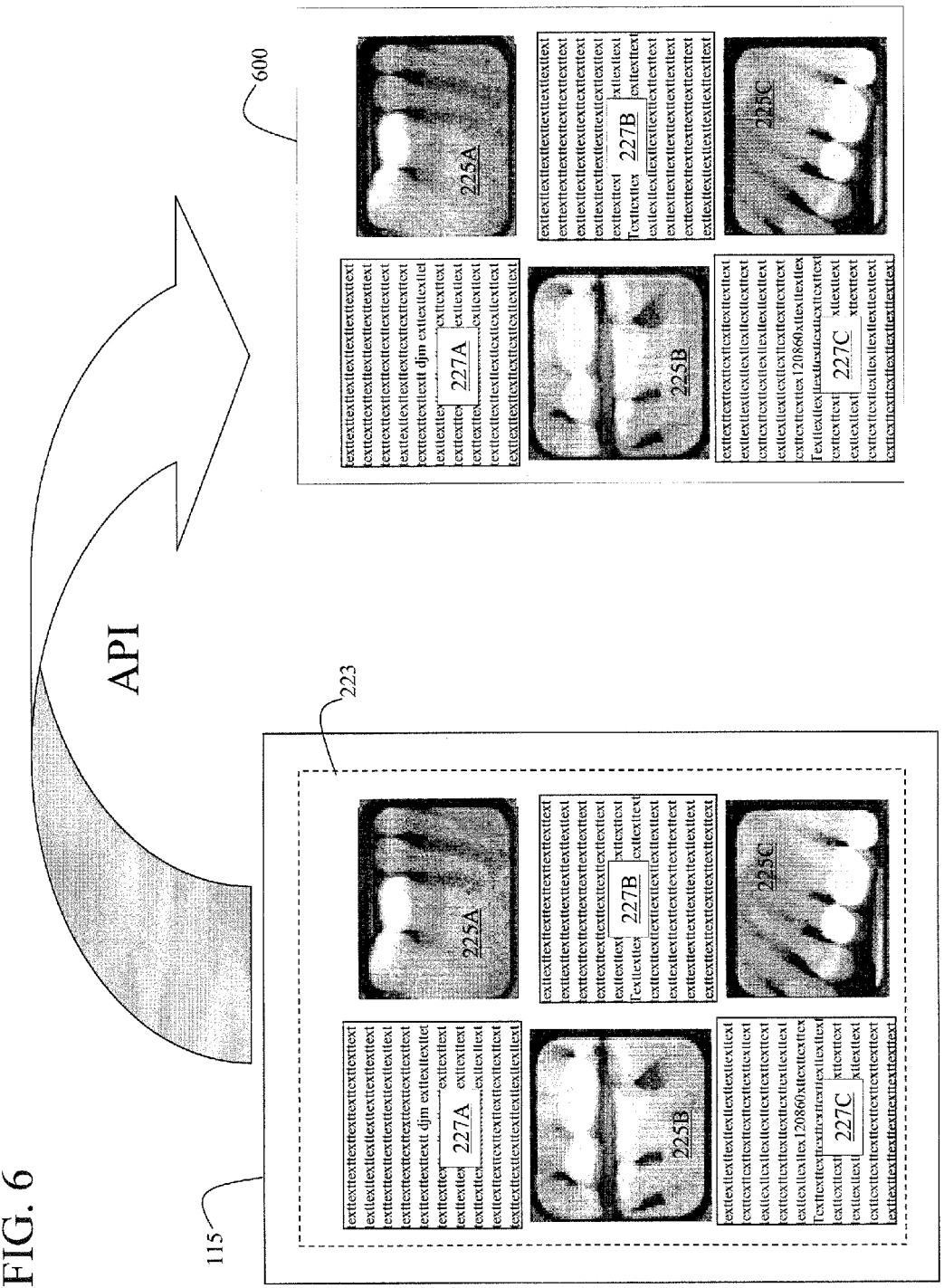
FIG. 6 graphically illustrates the concept of a populated document layout representation being used to generate a third-party document, in accordance with an embodiment of the present invention.

FIG. 6 graphically illustrates the concept of a populated document layout representation 223 being used to generate a third-party document 600, in accordance with an embodiment of the present invention. The third-party document 600 looks very similar to the populated document layout representation 223. However, the populated document layout representation 223 is simply a representation of a third-party document layout, whereas the third-party document 600 is an actual document that may be manipulated in accordance with all of the functionality provided by the third-party document generation application 120. For example, the third-party document may be edited, copied, and saved.

The illustrations and examples given so far herein are concerned with a single page of a document. For example, FIG. 6 illustrates a single page of a document layout representation being used to generate a corresponding single page of a third-party document. However, in accordance with an embodiment of the present invention, the document layout representation 223 and the third-party document 600 are not limited to a single page and may include a plurality of pages. The information management software application 110 provides the capability to jump forward or backward, as the case may be, to a page that is adjacent, in order, to the current page displayed. The document layout representation of the individual pages may be exactly the same, similar to, or very different from each other, in accordance with various embodiments of the present invention.

In accordance with an embodiment of the present invention, just as digital files may be dragged and dropped into data holder locations, a digital file that has been previously copied to a clipboard using the information management software application may also be pasted to a data holder location using the information management software application. In such a case, the digital file comprises a clipboard object file and the corresponding digital data content comprises a clipboard object. As used herein, a clipboard object file is any type of formatted software element (e.g., a text clip, an image file, a graphic file) that allows any type of digital data content (e.g., text, an image, a graphic) to be copied to and pasted from a clipboard.

An embodiment of the present invention provides a software interface 130 embodied on a computer-readable medium for execution on a computer-based platform. The software interface 130 is executed in conjunction with an information management software program 110 for populating a document layout representation with image, text, graphic, and/or clipboard information, and in conjunction with a third-party document generation program 120 for generating third-party documents. The software interface comprises at least one application program interface (API) that facilitates communication between the information management software program and the third-party document generation program. The API directs the third-party document generation program to generate a third-party document based on a populated document layout representation displayed within a window of the information management software program.

In accordance with various embodiments of the present invention, the computer-readable medium may comprise a hard disk, a floppy disk, a compact disk (CD), a memory stick, a digital video disk (DVD), or any other type of computer-readable medium capable of having the computer-executable instructions as described herein.

Figure 7:
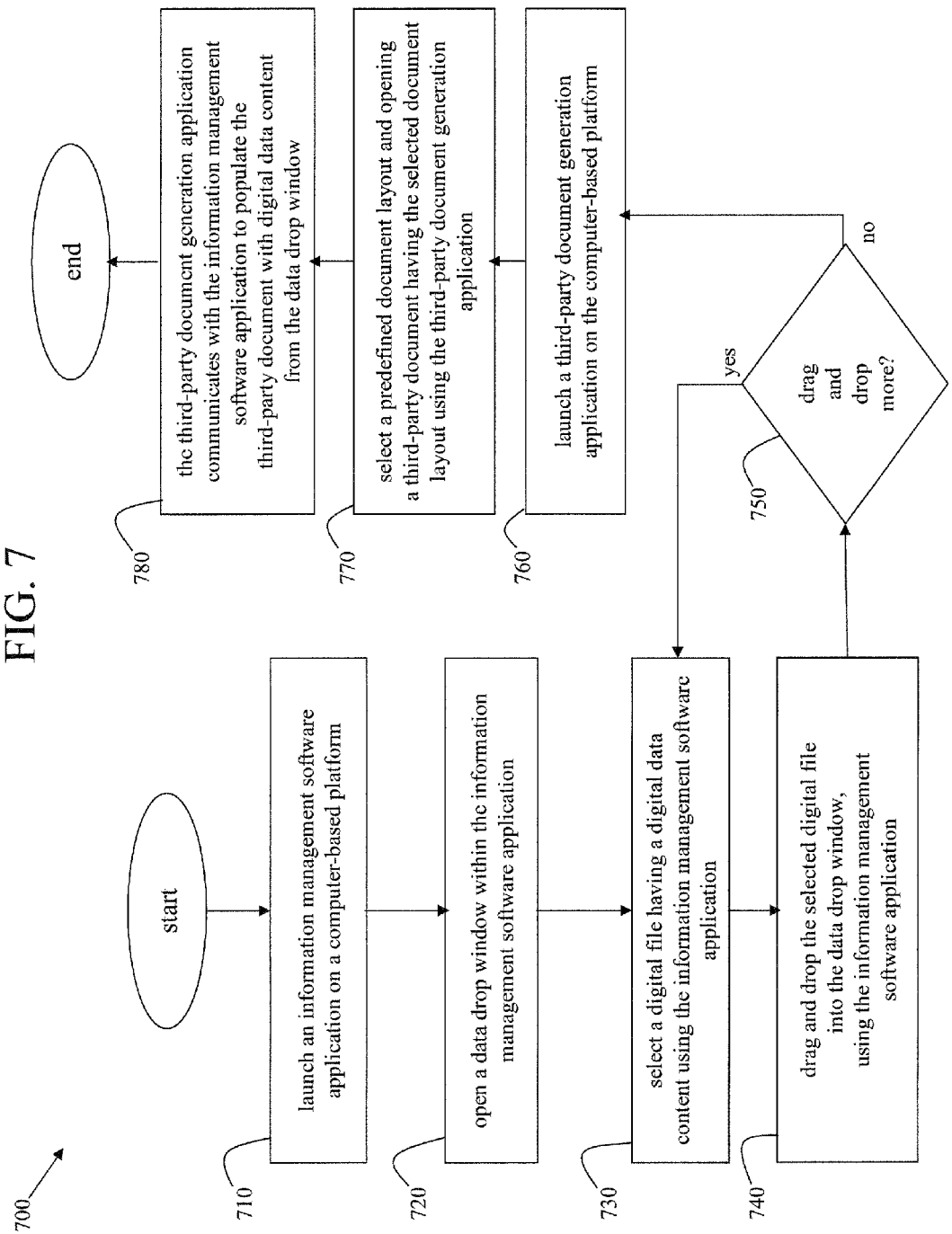
FIG. 7 is a flowchart of a second exemplary embodiment of a method of populating a document with digital information content, in accordance with various aspects of the present invention.

FIG. 7 is a flowchart of a second exemplary embodiment of a method 700 of populating a document with digital information content, in accordance with various aspects of the present invention. In step 710, an information management software application is launched on a computer-based platform. In step 720, a data drop window is opened within the information management software application. In step 730, a digital file having a digital data content is selected using the information management software application. In step 740, the selected digital file is dragged and dropped into the data drop window, using the information management software application. In step 750, a decision is made as to whether or not to select and drag and drop any further digital files into the data drop window. If so, then the additional digital files are dragged and dropped. If not, then in step 760, a third-party document generation application is launched on the computer-based platform. In step 770, a predefined document layout and a third-party document, having the selected document layout, are selected using the third-party document generation application. In step 780, the third-party document generation application communicates with the information management software application to populate the third-party document with digital data content from the data drop window. The third-party document generation application may communicate with the information management software application through at least one application program interface (API), in accordance with an embodiment of the present invention.

Notice that, in the method 700, the data drop window does not include a document layout representation. Instead, digital files are simply dropped into the data drop window. It is up to the third-party document generation application and/or an API to decide how to populate the data holder locations of the third-party document with the digital data content of the digital files in the data drop window based on a document layout selected using the third-party document generation application. For example, the data holder locations of the third-party document may be populated with digital data content based on the order in which the digital files were dropped into the data drop window. In other words, a first data holder location may be populated with the digital data content from a first digital file dropped into the data drop window and a second data holder location may be populated with the digital data content from a second digital file dropped into the data drop window, and so on. Again, the digital data content of the digital files may include text, image, graphic, and clipboard digital data content. As before, digital files copied to a clipboard may be pasted into the data drop window. Also, the information management software application may be, for example, a patient management software application. The third-party document generation application may be, for example, a word processing software application or a slide presentation software application.

Other populating schemes are possible as well. For example, the data holder locations of the third-party document may predefine the type of data holder location as a text, an image, or a graphic data holder location. Therefore, in accordance with an embodiment of the present invention, only digital data content that corresponds to a predefined data holder location type may be populated into that data holder location.

In accordance with an embodiment of the present invention, once the third-party document is populated with digital data content from the data drop window, a user may move the digital data content around to different data holder locations within the third-party document as part of the editing process of the third-party document generation application.

Figure 8:
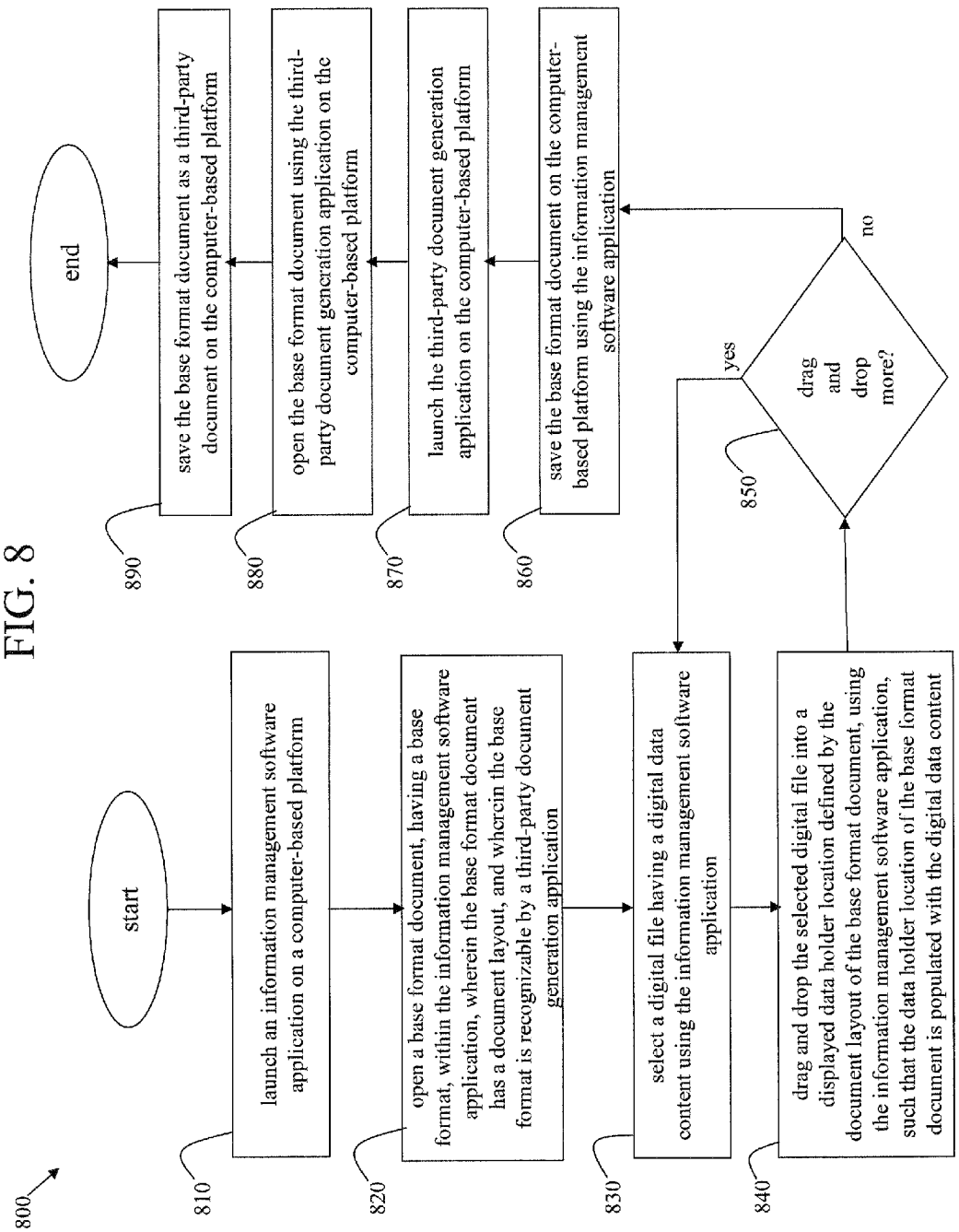
FIG. 8 is a flowchart of a third exemplary embodiment of a method of populating a document with digital information content, in accordance with various aspects of the present invention.

Other embodiments of the present invention do not use an application program interface (API) as does the method 500 of FIG. 5. For example, FIG. 8 is a flowchart of a third exemplary embodiment of a method 800 of populating a document with digital information content, in accordance with various aspects of the present invention. In step 810, an information management software application is launched on a computer-based platform. In step 820, a base format document, having a base format, is opened within the information management software application, wherein the base format document has a document layout, and wherein the base format is recognizable by a third-party document generation application. In step 830, a digital file having a digital data content is selected using the information management software application. In step 840, the selected digital file is dragged and dropped into a displayed data holder location defined by the document layout of the base format document using the information management software application, such that the data holder location of the base format document is populated with the digital data content. In step 850, a decision is made as to whether or not to select and drag and drop any further digital files into the base format document. If so, then the additional digital files are dragged and dropped. If not, then in step 860, the base format document is saved on the computer-based platform using the information management software application. In step 870, the third-party document generation application is launched on the computer-based platform. In step 880, the base format document is opened using the third-party document generation application on the computer-based platform. In step 890, the base format document is saved as a third-party document on the computer-based platform using the third-party document generation application. Again, digital files may be pasted into the base format document from the clipboard.

Notice that, in the method 800, instead of a data drop window, a base format document is provided, the base format of which is recognizable by the third-party document generation application. The base format document may have one or several pages, each page having one or more data holder locations. This means that the populated base format document, which is created in the information management software application, may be opened by the third-party document generation application and saved as (i.e., converted to) a regular third-party document (e.g., a MS Word document if the third-party application is MS WORD, or a MS PowerPoint document if the third-party application is MS PowerPoint).

The base format document is not a full-up third party document but has enough of the basic characteristics of a third-party document such that the populated base format document can be turned into a full-up third-party document by opening the base format document using the third-party application, and by saving the base format document as a third-party document using the third-party application. By a full-up third-party document, as used herein, is meant a document that is capable of being fully manipulated (e.g., edited, copied, saved) according to the functionality of the third-party application. In the method 800, there is no communication between the information management software application and the third-party document generation application through, for example, an API.

Therefore, in such a method 800, the information management software application is somewhat dependent on the third-party document generation application to be used. Whereas, the methods 500 and 700 are much more, if not totally, independent of the third-party document generation application.

Again, the digital data content may comprise text, images, graphics, and/or clipboard objects, in accordance with an embodiment of the present invention. Also, the information management software application may be, for example, a patient management software application. The third-party document generation application may be, for example, a word processing software application or a slide presentation software application.

An embodiment of the present invention provides a computer-readable medium having computer-executable instructions for performing a method on a computer-based platform. The method comprises opening and displaying a data drop window. The method further comprises selecting and displaying a representation of a predefined document layout within the data drop window. The method also comprises selecting a first digital file having a first digital data content. The method further comprises dragging and dropping the selected first digital file into a displayed first data holder location of the displayed document layout representation within the data drop window such that the first data holder location of the displayed document layout representation is populated with the first digital data content. The method also comprises communicating with a third-party document generation application via at least one application program interface (API) such that the at least one API directs the third-party document generation application to generate a third-party document based on the populated document layout representation within the data drop window. The method may further comprise dragging and dropping (or pasting from a clipboard) additional digital files, having digital data content, in a similar manner.

Again, the digital data content may comprise text, images, graphics, and/or clipboard objects, in accordance with an embodiment of the present invention. Also, the information management software application may be, for example, an insurance management software application. The third-party document generation application may be, for example, a word processing software application or a slide presentation software application.

In accordance with various embodiments of the present invention, the computer-readable medium may comprise a hard disk, a floppy disk, a compact disk (CD), a memory stick, a digital video disk (DVD), or any other type of computer-readable medium capable of having the computer-executable instructions as described herein.

In summary, embodiments of the present invention provide methods and computer-readable medium for populating a document with digital information content. Digital files, containing digital data content, that are accessed and used in an information management software application such as, for example, a patient management software application, may be easily dragged and dropped or pasted into a data drop window or a base format document such that a third-party document may be automatically populated with the digital data content.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of populating a document with digital information content, said method comprising:

launching an information management software application on a computer-based platform;

opening a data drop window within said information management software application to display a representation of a document layout within said data drop window;

selecting a first digital file having a first digital data content using said information management software application;

dragging and dropping said selected first digital file into a displayed first data holder location of said displayed document layout representation within said data drop window, using said information management software application, such that said first data holder location of said displayed document layout representation is populated with said first digital data content;

launching a third-party document generation application on said computer-based platform; and said information management software application communicating with said third-party document generation application via at least one application program interface (API) on said computer-based platform such that said at least one API directs said third-party document generation application to generate a third-party document based on said populated document layout representation within said data drop window.

2. The method of claim 1 further comprising pasting a second digital file, having a second digital data content, from a clipboard into a displayed second data holder location of said displayed document layout representation within said data drop window such that said second data holder location of said displayed document layout representation is populated with said second digital data content before performing said step of communicating with said third-party document generation application via said at least one application program interface (API).

3. The method of claim 2 wherein said second digital file comprises a clipboard object file and said second digital data content comprises a clipboard object.

4. The method of claim 1 further comprising:
selecting a second digital file having a second digital data content, using said information management software application, before performing said step of communicating with said third-party document generation application via said application program interface (API); and
dragging and dropping said selected second digital file into a displayed second data holder location of said displayed document layout representation within said data drop window, using said information management software application, such that said second data holder location of said displayed document layout representation is populated with said second digital data content before performing said step of communicating with said third-party document generation application via said at least one application program interface (API).

5. The method of claim 4 further comprising:
selecting a third digital file having a third digital data content, using said information management software application, before performing said step of communicating with said third-party document generation application via said application program interface (API); and
dragging and dropping said selected third digital file into a displayed third data holder location of said displayed document layout representation within said data drop window, using said information management software application, such that said third data holder location of said displayed document layout representation is populated with said third digital data content before performing said step of communicating with said third-party document generation application via said at least one application program interface (API).

6. The method of claim 5 wherein said third digital file comprises an image file and said third digital data content comprises an image.

7. The method of claim 5 wherein said third digital file comprises a text file and said third digital data content comprises text.

8. The method of claim 5 wherein said third digital file comprises a graphic file and said third digital data content comprises a graphic.

9. The method of claim 4 wherein said second digital file comprises an image file and said second digital data content comprises an image.

10. The method of claim 4 wherein said second digital file comprises a text file and said second digital data content comprises text.

11. The method of claim 4 wherein said second digital file comprises a graphic file and said second digital data content comprises a graphic.

12. The method of claim 1 wherein said first digital file comprises an image file and said first digital data content comprises an image.

13. The method of claim 1 wherein said first digital file comprises a text file and said first digital data content comprises text.

14. The method of claim 1 wherein said first digital file comprises a graphic file and said first digital data content comprises a graphic.

15. The method of claim 1 further comprising saving said third-party document using said third-party document generation application.

16. The method of claim 1 wherein said information management software application comprises a patient management software application.

17. The method of claim 1 wherein said third-party document generation application comprises a word processing software application.

18. The method of claim 1 wherein said third-party document generation application comprises a slide presentation software application.

19. The method of claim 1 further comprising editing said third-party document using said third-party document generation application.

20. A software interface embodied on a computer-readable medium for execution on a computer-based platform in conjunction with an information management software program for populating a document layout representation with image, text, graphic, and/or clipboard information, and in conjunction with a third-party document generation application for generating third party documents, said software interface comprising:
at least one application program interface that facilitates communication between said information management software application and said third-party document generation application such that said at least one application program interface directs said third-party document generation application to generate a third-party document based on a populated document layout representation displayed within a window of said information management software application.

21. A method of populating a document with digital information content, said method comprising:
launching an information management software application on a computer-based platform;
opening a data drop window within said information management software application;
selecting a first digital file having a first digital data content using said information management software application;
dragging and dropping said selected first digital file into said data drop window using said information management software application;
launching a third-party document generation application on said computer-based platform;
selecting a predefined document layout and opening a third-party document having said selected document layout using said third-party document generation application; and
said third-party document generation application communicating with said information management software application to populate said third-party document with digital data content from said data drop window.

22. The method of claim 21 further comprising pasting a second digital file, having a second digital data content, from a clipboard into said data drop window before performing said step of said third-party document generation application communicating with said information management software application to populate said third-party document with digital data content from said data drop window.

23. The method of claim 22 wherein said second digital file comprises a clipboard object file and said second digital data content comprises a clipboard object.

24. The method of claim 22 wherein said first digital data content is populated into a first predefined data holder location of said document layout of said third party document, and said second digital data content is populated into a second predefined data holder location of said document layout of said third party document.

25. The method of claim 22 wherein said first and second digital data content are populated into said third-party document in a same order as said first and second digital files are dragged and dropped into said data drop window.

26. The method of claim 21 further comprising:
  selecting a second digital file having a second digital data content, using said information management software application, before performing said step of said third-party document generation application communicating with said information management software application to import digital data content into said third-party document from said data drop window; and
  dragging and dropping said selected second digital file into said data drop window, using said information management software application, before performing said step of said third-party document generation application communicating with said information management software application to populate said third-party document with digital data content from said data drop window.

27. The method of claim 26 further comprising:
  selecting a third digital file having a third digital data content, using said information management software application, before performing said step of said third-party document generation application communicating with said information management software application to import digital data content into said third-party document from said data drop window; and
  dragging and dropping said selected third digital file into said data drop window, using said information management software application, before performing said step of said third-party document generation application communicating with said information management software application to populate said third-party document with digital data content from said data drop window.

28. The method of claim 27 wherein said third digital file comprises an image file and said third digital data content comprises an image.

29. The method of claim 27 wherein said third digital file comprises a text file and said third digital data content comprises text.

30. The method of claim 27 wherein said third digital file comprises a graphic file and said third digital data content comprises a graphic.

31. The method of claim 27 wherein said first digital data content is populated into a first predefined data holder location of said document layout of said third party document, said second digital data content is populated into a second predefined data holder location of said document layout of said third party document, and said third digital data content is populated into a third predefined data holder location of said document layout of said third party document.

32. The method of claim 27 wherein said first, second, and third digital data content are populated into said third-party document in a same order as said first, second, and third digital files are dragged and dropped into said data drop window.

33. The method of claim 26 wherein said second digital file comprises an image file and said second digital data content comprises an image.

34. The method of claim 26 wherein said second digital file comprises a text file and said second digital data content comprises text.

35. The method of claim 26 wherein said second digital file comprises a graphic file and said second digital data content comprises a graphic.

36. The method of claim 26 wherein said first digital data content is populated into a first predefined data holder location of said document layout of said third party document, and said second digital data content is populated into a second predefined data holder location of said document layout of said third party document.

37. The method of claim 21 wherein said first digital file comprises an image file and said first digital data content comprises an image.

38. The method of claim 21 wherein said first digital file comprises a text file and said first digital data content comprises text.

39. The method of claim 21 wherein said first digital file comprises a graphic file and said first digital data content comprises a graphic.

40. The method of claim 21 further comprising saving said third-party document using said third-party document generation application.

41. The method of claim 21 wherein said information management software application comprises a patient management software application.

42. The method of claim 21 wherein said third-party document generation application comprises a word processing software application.

43. The method of claim 21 wherein said third-party document generation application comprises a slide presentation software application.

44. The method of claim 21 further comprising editing said third-party document using said third-party document generation application.

45. The method of claim 21 wherein said first digital data content is populated into a first predefined data holder location of said document layout of said third party document.

46. The method of claim 21 wherein said third-party document generation application communicates with said information management software application through at least one application program interface.

47. A method of populating a document with digital information content, said method comprising:
  launching an information management software application on a computer-based platform;
  opening a first base format document, having a base format, within said information management software application, wherein said first base format document has a first document layout, and wherein said base format is recognizable by a third-party document generation application;

selecting a first digital file having a first digital data content using said information management software application;

dragging and dropping said selected first digital file into a displayed first data holder location defined by said first document layout of said first base format document, using said information management software application, such that said first data holder location of said first base format document is populated with said first digital data content;

saving said first base format document on said computer-based platform using said information management software application;

launching said third-party document generation application on said computer-based platform;

opening said first base format document using said third-party document generation application on said computer-based platform; and saving said first base format document as a third-party document on said computer-based platform.

48. The method of claim 47 further comprising:

pasting a second digital file, having a second digital data content, from a clipboard to a second data holder location defined by said first document layout of said first base format document, using said information management software application, such that said second data holder location of said first base format document is populated with said second digital data content, before said step of opening said first base format document using said third-party document generation application on said computer-based platform.

49. The method of claim 48 wherein said second digital file comprises a clipboard object file and said second digital data content comprises a clipboard object.

50. The method of claim 47 further comprising:

selecting a second digital file having a second digital data content, using said information management software application, before said step of opening said first base format document using said third-party document generation application on said computer-based platform; and dragging and dropping said selected second digital file into a displayed second data holder location defined by said first document layout of said first base format document, using said information management software application, such that said second data holder location of said first base format document is populated with said second digital data content before said step of opening said first base format document using said third-party document generation application on said computer-based platform.

51. The method of claim 50 further comprising:

selecting a third digital file having a third digital data content, using said information management software application, before said step of opening said first base format document using said third-party document generation application on said computer-based platform; and dragging and dropping said selected third digital file into a displayed third data holder location defined by said first document layout of said first base format document, using said information management software application, such that said third data holder location of said first base format document is populated with said third digital data content before said step of opening said first base format document using said third-party document generation application on said computer-based platform.

52. The method of claim 51 wherein said third digital file comprises an image file and said third digital data content comprises an image.

53. The method of claim 51 wherein said third digital file comprises a text file and said third digital data content comprises text.

54. The method of claim 51 wherein said third digital file comprises a graphic file and said third digital data content comprises a graphic.

55. The method of claim 50 wherein said second digital file comprises an image file and said second digital data content comprises an image.

56. The method of claim 50 wherein said second digital file comprises a text file and said second digital data content comprises text.

57. The method of claim 50 wherein said second digital file comprises a graphic file and said second digital data content comprises a graphic.

58. The method of claim 47 wherein said first digital file comprises an image file and said first digital data content comprises an image.

59. The method of claim 47 wherein said first digital file comprises a text file and said first digital data content comprises text.

60. The method of claim 47 wherein said first digital file comprises a graphic file and said first digital data content comprises a graphic.

61. The method of claim 47 wherein said information management software application comprises a patient management software application.

62. The method of claim 47 wherein said third-party document generation application comprises a word processing software application.

63. The method of claim 47 wherein said third-party document generation application comprises a slide presentation software application.

64. The method of claim 47 further comprising editing said third-party document using said third-party document generation application.

65. A computer-readable medium having computer-executable instructions for performing a method on a computer-based platform, said method comprising:

opening and displaying a data drop window;

selecting and displaying a representation of a predefined document layout within said data drop window;

selecting a first digital file having a first digital data content;

dragging and dropping said selected first digital file into a displayed first data holder location of said displayed document layout representation within said data drop window such that said first data holder location of said displayed document layout representation is populated with said first digital data content; and communicating with a third-party document generation application via at least one application program interface (API) such that said at least one API directs said third-party document generation application to generate a third-party document based on said populated document layout representation within said data drop window.

66. The computer-readable medium of claim 65 wherein said method further comprises pasting a second digital file, having a second digital data content, from a clipboard into a displayed second data holder location of said displayed document layout representation within said data drop window such that said second data holder location of said displayed document layout representation is populated with said second digital data content before performing said step of communicating with a third-party document generation application.

67. The computer-readable medium of claim 66 wherein said second digital file comprises a clipboard object file and said second digital data content comprises a clipboard object.

68. The computer-readable medium of claim 65 wherein said method further comprises:
- selecting a second digital file having a second digital data content before performing said step of communicating with a third-party document generation application; and
- dragging and dropping said selected second digital file into a displayed second data holder location of said displayed document layout representation within said data drop window such that said second data holder location of said displayed document layout representation is populated with said second digital data content before performing said step of communicating with said third-party document generation application.

69. The computer-readable medium of claim 68 wherein said method further comprises:
- selecting a third digital file having a third digital data content before performing said step of communicating with said third-party document generation application; and
- dragging and dropping said selected third digital file into a displayed third data holder location of said displayed document layout representation within said data drop window such that said third data holder location of said displayed document layout representation is populated with said third digital data content before performing said step of communicating with said third-party document generation application.

70. The computer-readable medium of claim 69 wherein said third digital file comprises an image file and said third digital data content comprises an image.

71. The computer-readable medium of claim 69 wherein said third digital file comprises a text file and said third digital data content comprises text.

72. The computer-readable medium of claim 69 wherein said third digital file comprises a graphic file and said third digital data content comprises a graphic.

73. The computer-readable medium of claim 68 wherein said second digital file comprises an image file and said second digital data content comprises an image.

74. The computer-readable medium of claim 68 wherein said second digital file comprises a text file and said second digital data content comprises text.

75. The computer-readable medium of claim 68 wherein said second digital file comprises a graphic file and said second digital data content comprises a graphic.

76. The computer-readable medium of claim 65 wherein said first digital file comprises an image file and said first digital data content comprises an image.

77. The computer-readable medium of claim 65 wherein said first digital file comprises a text file and said first digital data content comprises text.

78. The computer-readable medium of claim 65 wherein said first digital file comprises a graphic file and said first digital data content comprises a graphic.

79. The computer-readable medium of claim 65 wherein said computer-executable instructions for performing said method on said computer-based platform comprises a patient management software application.

80. The computer-readable medium of claim 65 wherein said third-party document generation application comprises a word processing software application.

81. The computer-readable medium of claim 65 wherein said third-party document generation application comprises a slide presentation software application.

* * * * *